Figure 1:
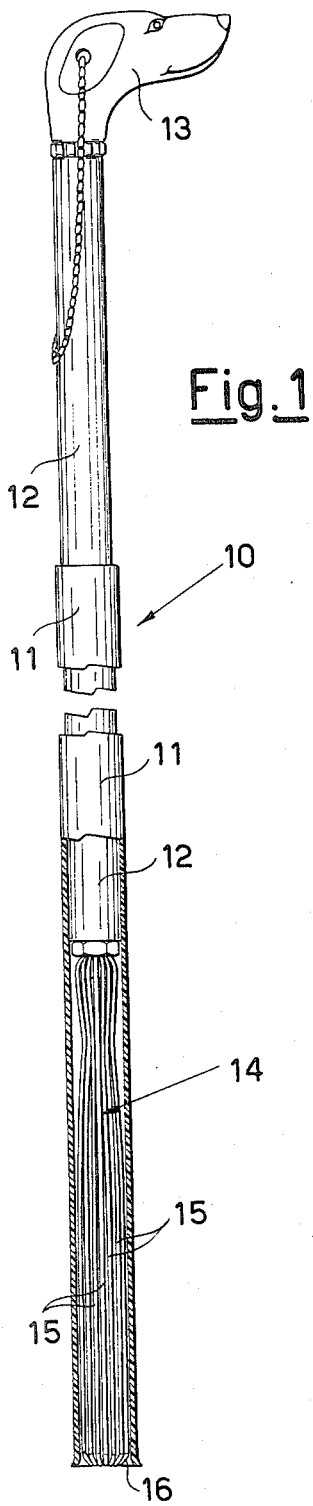

United States Patent [19]

DeToma

[11] 4,225,169

[45] Sep. 30, 1980

[54] PINCER-LIKE TOOL, ESPECIALLY FOR COLLECTING ORGANIC DEJECTIONS OF ANIMALS TO ENCLOSE THEM IN A CONTAINER

[76] Inventor: Michele DeToma, Traversa Via Veneto 3, Brescia, Italy

[21] Appl. No.: 967,086

[22] Filed: Dec. 6, 1978

[30] Foreign Application Priority Data

Dec. 21, 1977 [IT] Italy .................. 7139/77 [U]

[51] Int. Cl.³ ............................................ A47F 13/06
[52] U.S. Cl. .................................................. 294/1 BA
[58] Field of Search ............. 294/1 R, 19 R, 55, 50.8, 294/50.9, 115; 15/257.1, 257.6; 119/1 R

[56] References Cited

U.S. PATENT DOCUMENTS

| | | | |
|---|---|---|---|
| 3,716,263 | 2/1973 | Gatti | 294/1 R |
| 4,056,278 | 11/1977 | Bau et al. | 294/1 R |

*Primary Examiner*—James B. Marbert
*Attorney, Agent, or Firm*—Offner & Kuhn

[57] ABSTRACT

For picking up and disposing of animal dejections in a clean and hygienically acceptable manner, a tool is disclosed which comprises a stick, externally similar to a walking stick consisting of two telescopically slidable members which actuate a mechanical hand similar to the assembly of umbrella ribs so as to open and close such ribs in order to clasp the dirty material and to place it in a baglike disposable container.

2 Claims, 9 Drawing Figures

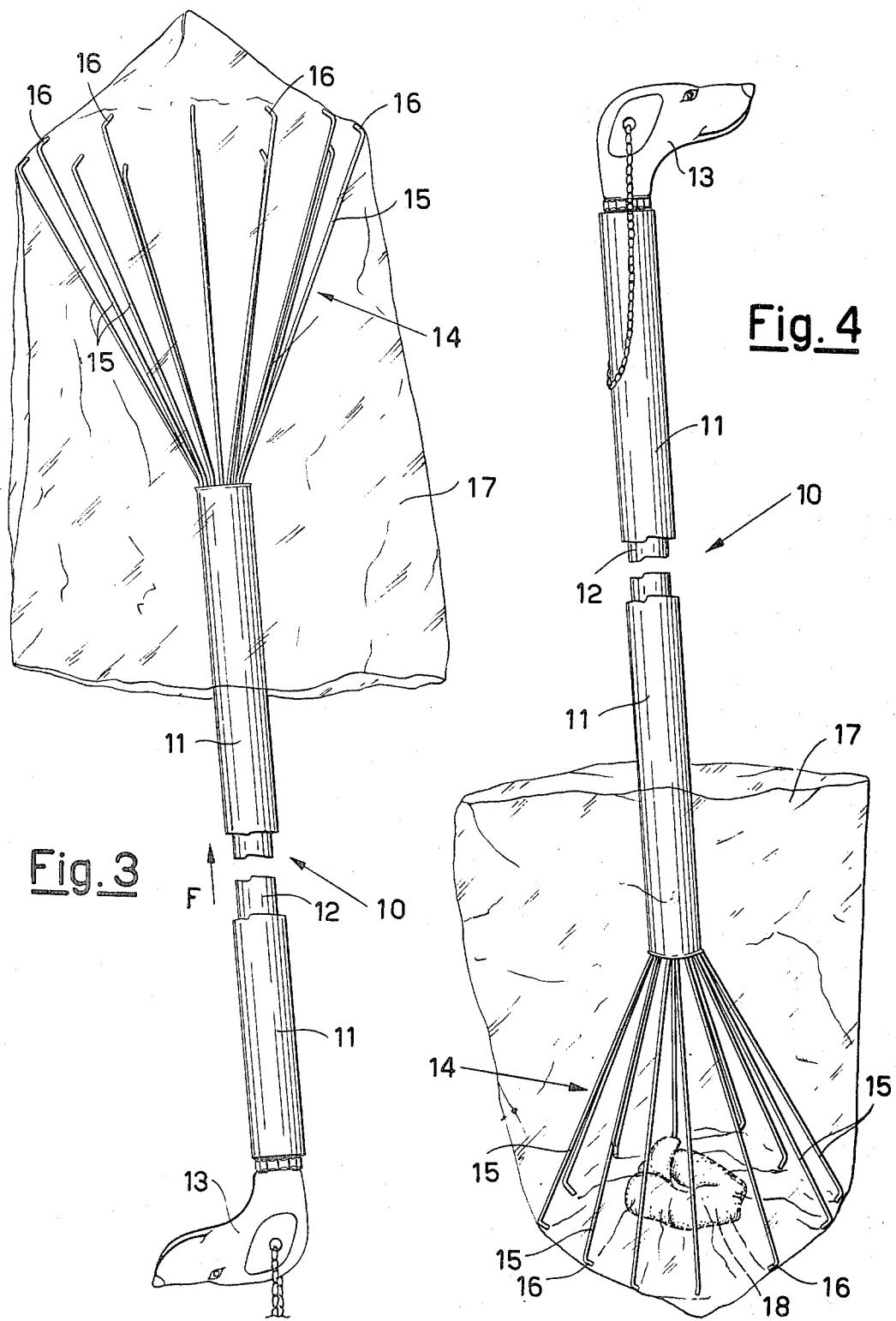

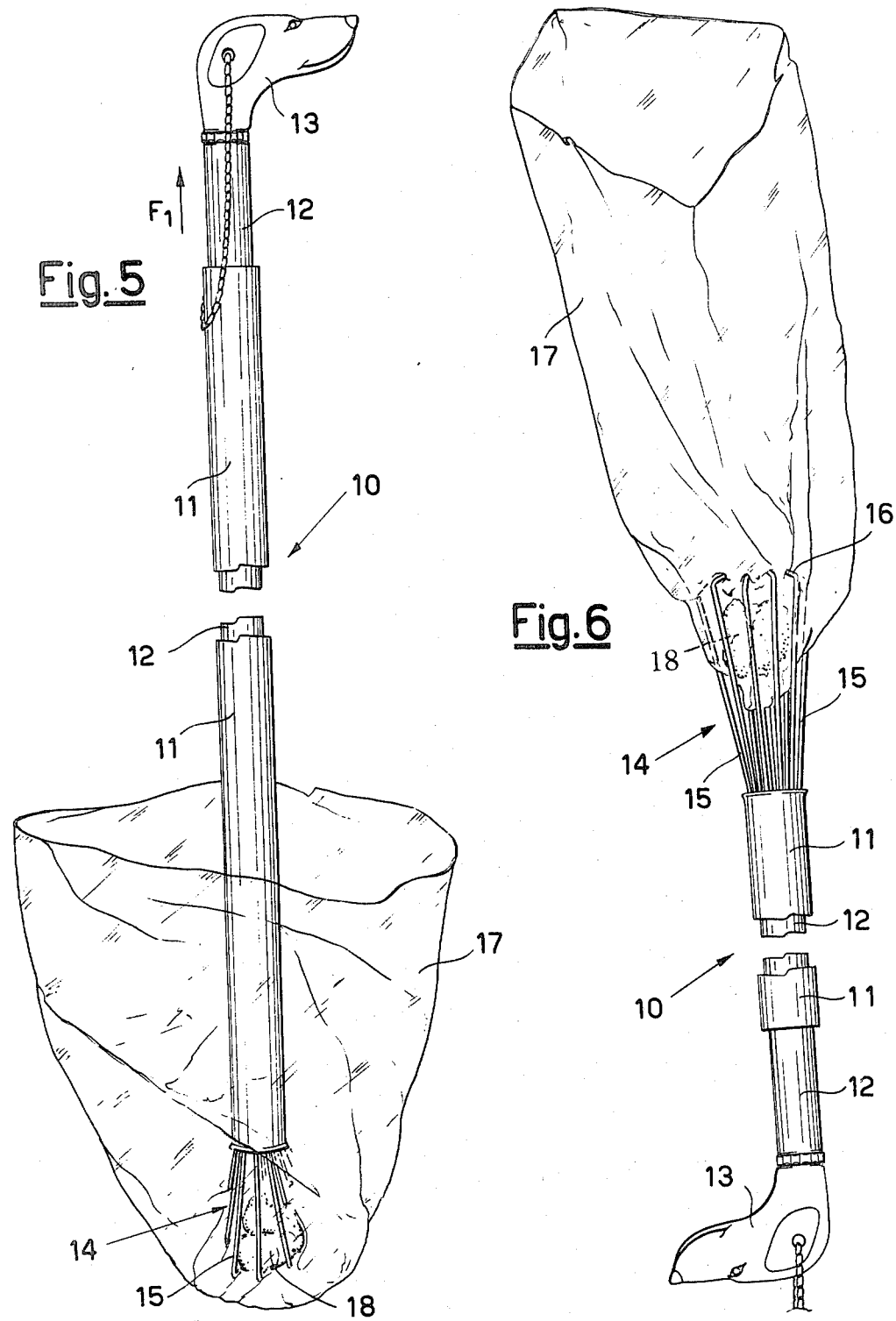

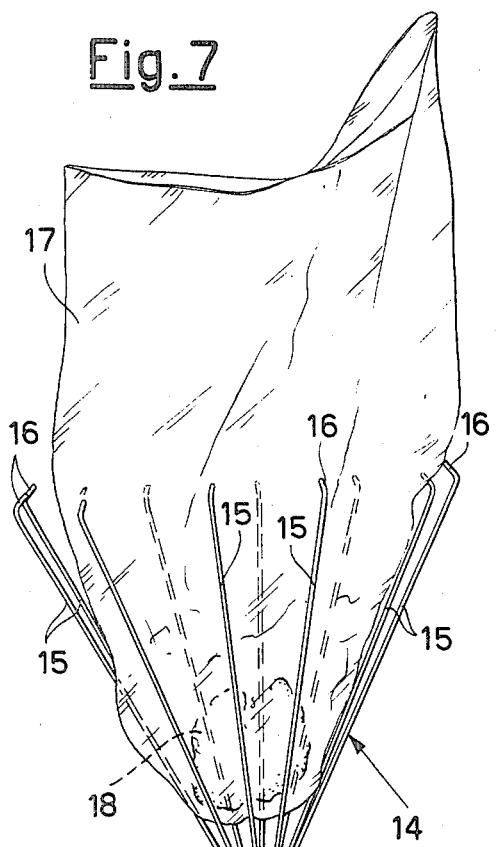
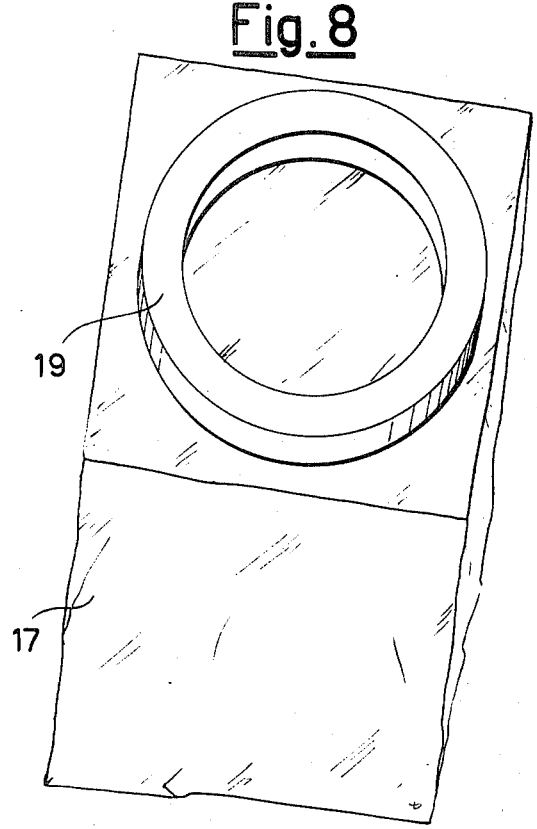
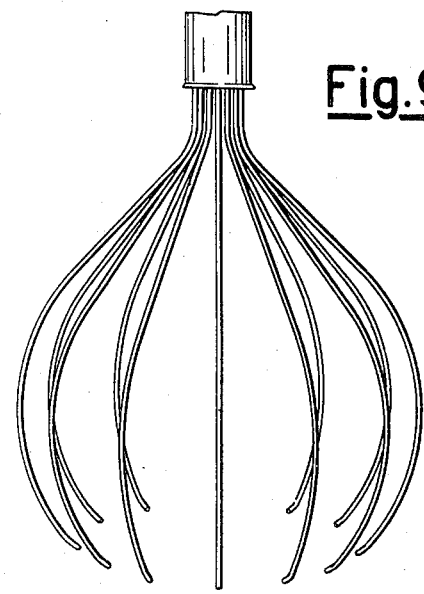

PINCER-LIKE TOOL, ESPECIALLY FOR COLLECTING ORGANIC DEJECTIONS OF ANIMALS TO ENCLOSE THEM IN A CONTAINER

A problem for which an emerging public interest is experienced and which has not yet been satisfactorily solved is that relating to the disposal of solid excrements left every day by dogs on sidewalks, on streets and, at best, in public gardens.

It has been statistically demonstrated that every day in the world, dogs cast down an enormous amount of dejections.

Self-explanatory reasons of both hygienic and sanitary nature have led the most civilized countries to face this problem by imposing to the dog proprietors to collect the dejections and to cast same into a refuse-collecting basket or, in extreme cases, to carry such material home.

The problem thus exists, for the owner of an animal, to have at immediate disposal an instrument enabling him to collect the detejections in a manner which is both clean and rationally acceptable.

The simplest approach has been to oblige the animal-owner to bring with him, or to take from specially provided coin-operated dispensers a stiff shovel and a bag, to collect the dejections with.

It is apparent that such a method is both inconvenient and not hygienically satisfactory in absolute, and that it also implies considerable installation and running cost for such dispensers.

Otherwise, a sort of shell-like container has been envisaged, between the valves of which the dejections to be disposed of are caught. Such a tool, however, is affected by the serious defect that it must continually be washed and sterilized.

The principal object of the present invention is thus to provide a tool, more particularly for picking up dogs' dejections, by means of which the reject may be picked up and bagged with the maximum hygiene into a previously prepared bag to be thrown away, without soiling the tool as such or the user's hands, either.

Another object of the invention is to provide a tool having the features outlined above, but which is capable also of collecting dejections of dogs affected with diarrhoea.

Yet another object of the present invention is to provide a tool which can be operated without compelling the user to bow down.

The objects enumerated above are achieved, according to the present invention, by a telescopable stick which comprises at least an outer member and at least an internal member, either end of said internal member being terminated by a handle, whereas the opposite end is terminated by a mechanical hand which is automatically outstretched, or clasps, whenever the inner member is translated in either direction, or the opposite direction, respectively, said mechanical hand being contained, in its retracted position, in the interior of the stick and being intended to be outstretched within a container positioned on the tip of the stick aforesaid.

Preferably, the mechanical hand is composed by a spider-like array of thread-like fingers which are resiliently flexible and which diverge from the end of the internal member of the stick to which such fingers are fastened.

The mechanical fingers can be made of metal, for example piano wire, or also of an appropriate plastics material and, in their outstretched position, they can take, for example, a conical configuration, or a cuplike outline, the free ends of such fingers being curled inwardly.

The structural and fuctional features of the invention and its advantages will become still more clearly apparent from the scrutiny of the ensuing exemplary description, aided by the accompanying drawings, wherein:

FIG. 1 is a view, partly in cross-section, showing a stick tool made according to the invention in the inoperative position in which it is carried in the hand.

FIGS. from 2 to 7 inclusive show in sequential order the way in which the device of FIG. 1 can be used, FIG. 8 shows a type of bag which can be used in the case of a diarrhoea-affected dog, and FIG. 9 shows an alternative embodiment of the mechanical hand.

In FIG. 1 of the accompanying drawings, the numeral 10 generally indicates the tool in question: this is structurally composed by a telescopable stick which comprises an outer member 11, and an internal member 12.

The internal member 12, has at either hand, a handle 13, and, at the opposite hand, a mechanical hand generally indicated at 14. In the example shown and described herein, the mechanical hand is composed by a plurality of thread-like fingers 15, arranged in spiderlike relationship, so as to diverge from the end of the internal member 12, to which they are fastened. The fingers 15 are pliable in a resilient way and, to this purpose, they are made of a metal or an appropriate plastics material. To achieve an improved grasp, the fingers 15 are terminated, each, by an inwardly curled portion 16.

The operation of the tool described above is as follows:

In its inoperative position, the tool is as shown in FIG. 1, e.g. with the mechanical fingers being held, closed, in a bent condition, in the interior of the outer member 11. Thus, the tool can be carried in the hand like an ordinary walking stick.

Figure 2:
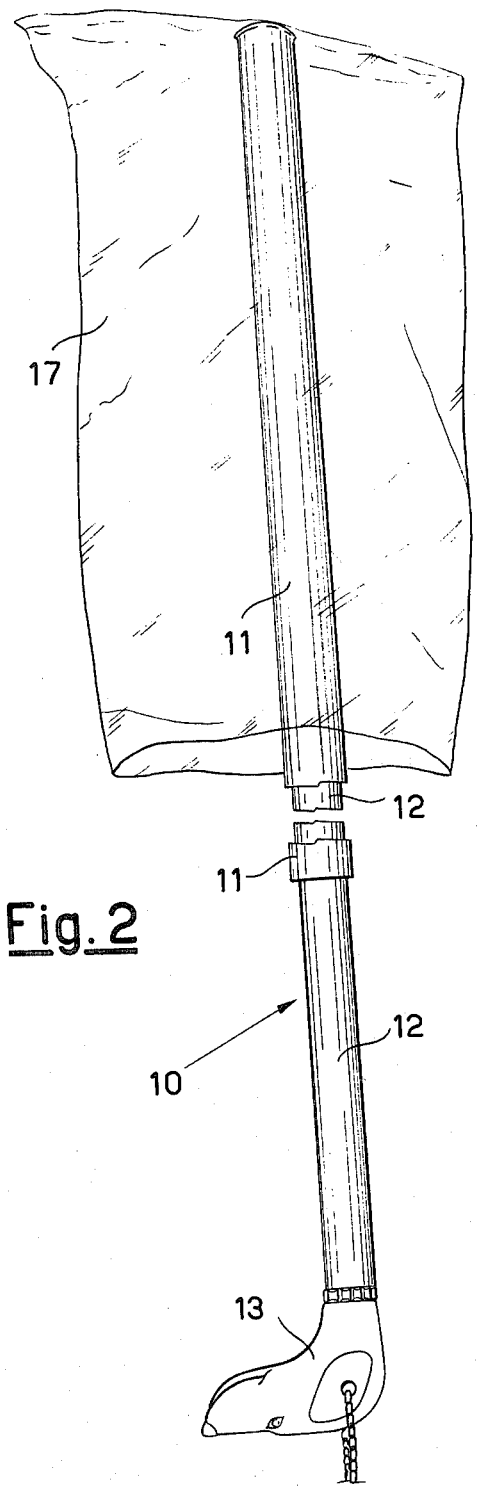

As the necessity arises of picking up the animal dejections, the animal-owner takes a bag 17 (that he must always carry with him), preferably of a biologically degradable material, and slips it onto the stick tip as shown in FIG. 2. Thereafter, the user, while holding with one hand the outer member 11, pushes with the other hand, which graps the stick, the internal member 12 in the direction of the arrow F. By so doing, the mechanical hand 14 emerges from the outer member 11 and the fingers flare out in the interior of the bag 17 (FIG. 3) under the bias of their inherent resiliency, as they are no longer being held by the outer member 11, as shown in FIG. 1.

At this stage, the user places the outer bottom wall of the bag 17 onto the dejections, symbolized at 18 (FIG. 4) and impresses a thrust which is enough to have the fingers 15 resting on the ground. Then, the internal member 12 is pulled inward in the direction of the arrow $F_1$ (towards the position of FIG. 1), so as to cause the mechanical hand, by the agency of the outer member 11, to clasp the dejections 18 as shown in FIG. 5. The user now sets the stick upside down in the position of FIG. 6, and overturns the bag 17, so that the dejections 18 may become enclosed within the interior of the bag. Eventually, the user causes the mechanical hand to be outstratched again, and, in the interior of the mechanical hand, the bag containing the dejections is allowed to fall (FIG. 7), so that the bag is ready to be closed and thrown into a garbage bin.

In the case of dogs affected with diarrhoea, the outer bottom wall of the bag can be provided with a sponge ring 19 which, in addition to absorbing the nearly fluid organic matter, sweeps the ground clean (FIG. 8).

The extreme constructional simplicity and the rational and hygienic mode of use of the tool according to the invention are thus apparent, the user being enabled to pick up the dejections of his animal without having the tool, or his hands, either, soiled by contacting the dirty material.

The mechanical hand could also be embodied otherwise than shown herein, provided that it can be automatically closed, or opened, concurrently with the sliding of the telescopic stick in a direction or in the opposite sense.

The scope of the present invention is thus defined in and by the claims appended hereto.

I claim:

1. A pincer device for the collection of organic animal wastes within an envelope fitted at the free end thereof, comprising: a telescopic stick consisting of an external hollow cylindrical element and an internal element coaxial therewith, one extremity of said internal element terminating in a grip and the opposite extremity thereof terminating in a mechanical hand consisting of a splayed group of resilient wire-shaped fingers which diverge from the extremity of the internal element to which said fingers are attached, the free ends of said wire-shaped fingers being curled towards the inside of said mechanical hand.

2. A pincer-like tool for picking up organic dejections of animals within a container, comprising a telescopable stick having an outer member and an internal member, one end of said internal member being terminated by a handle and the opposite end being terminated by a mechanical hand adapted to be automatically opened and closed as the internal member is translated in one longitudinal direction and in the opposite direction respectively, said hand being held in the closed position thereof in the interior of the stick and being adapted to be outstretched within a bag slipped onto said opposite end of said stick, the bottom wall of said bag having a ring of spongy material affixed thereto.

* * * * *